United States Patent
Salzman

(10) Patent No.: US 10,820,473 B2
(45) Date of Patent: Nov. 3, 2020

(54) WORK VEHICLE CONTROL SYSTEM

(71) Applicant: CNH Industrial America LLC, New Holland, PA (US)

(72) Inventor: Eran Salzman, Glenview, IL (US)

(73) Assignee: CNH Industrial America LLC, New Holland, PA (US)

( * ) Notice: Subject to any disclaimer, the term of this patent is extended or adjusted under 35 U.S.C. 154(b) by 409 days.

(21) Appl. No.: 15/818,401

(22) Filed: Nov. 20, 2017

(65) Prior Publication Data

US 2019/0150352 A1    May 23, 2019

(51) Int. Cl.
| | |
|---|---|
| *A01B 69/00* | (2006.01) |
| *A01B 76/00* | (2006.01) |
| *B62D 12/00* | (2006.01) |
| *B62D 1/00* | (2006.01) |

(52) U.S. Cl.
CPC .......... *A01B 69/007* (2013.01); *A01B 69/001* (2013.01); *A01B 76/00* (2013.01); *B62D 1/00* (2013.01); *B62D 12/00* (2013.01)

(58) Field of Classification Search
CPC ..... A01B 69/007; A01B 76/00; A01B 69/001; B62D 12/00; B62D 1/00
USPC ............... 701/41, 37, 73; 702/104; 56/341; 180/89.12, 127, 167, 168
See application file for complete search history.

(56) References Cited

U.S. PATENT DOCUMENTS

| | | |
|---|---|---|
| 3,232,376 A | 2/1966 | Lucas et al. |
| 5,297,650 A | 3/1994 | Gandiglio et al. |
| 5,813,494 A | 9/1998 | Ulschmid et al. |
| 6,178,364 B1 | 1/2001 | Delurey et al. |
| 6,264,227 B1 | 7/2001 | Johnson et al. |
| 6,356,819 B1* | 3/2002 | Winslow .............. G05D 1/0061 180/168 |
| 6,449,572 B1* | 9/2002 | Kurz ....................... B60T 8/172 702/94 |
| 6,525,276 B1* | 2/2003 | Vellidus ............... A01B 79/005 177/136 |
| 6,695,085 B2* | 2/2004 | Mackle .................... B62D 1/00 180/167 |
| 6,998,956 B2* | 2/2006 | Dix ........................ B60R 25/04 340/12.51 |
| 7,174,993 B2 | 2/2007 | Lantz |
| 7,354,050 B2* | 4/2008 | Brockway ................ B60R 3/02 182/127 |
| 7,508,315 B2 | 3/2009 | Zimmermann |
| 7,905,324 B2 | 3/2011 | Gil et al. |
| 9,016,423 B2 | 4/2015 | Wetterich |
| 9,238,941 B2 | 1/2016 | Ellement |
| 2011/0035104 A1* | 2/2011 | Smith .................. B60G 17/017 701/37 |
| 2013/0048400 A1* | 2/2013 | Holdener .................. B60R 3/02 180/89.1 |
| 2013/0193667 A1* | 8/2013 | Ellement ............... E02F 9/0833 280/166 |

(Continued)

*Primary Examiner* — Shardul D Patel
(74) *Attorney, Agent, or Firm* — Rickard K DeMille; Rebecca L. Henkel

(57) ABSTRACT

A work vehicle control system including a steering control system that controls steering of a work vehicle. A controller including a processor and memory, wherein the controller receives a signal indicative of a probability of an operator being outside of a cab of the work vehicle, and wherein the controller disables the steering control system in response to the signal.

19 Claims, 5 Drawing Sheets

(56) References Cited

U.S. PATENT DOCUMENTS

| | | | |
|---|---|---|---|
| 2015/0176467 A1* | 6/2015 | Adamson | F01N 9/00 |
| | | | 60/286 |
| 2018/0142446 A1* | 5/2018 | Silber | E02F 9/26 |
| 2018/0238016 A1* | 8/2018 | Seacat | E02F 3/3604 |
| 2019/0225144 A1* | 7/2019 | Takenaka | B60Q 3/217 |

* cited by examiner

WORK VEHICLE CONTROL SYSTEM

BACKGROUND

The present disclosure relates generally to a control system for a work vehicle.

Some work vehicles (e.g., tractors, harvesters, etc.) include a cab that houses an operator during operation. The cab may be climate controlled as well as provide access to control systems of the work vehicle (e.g., steering). A chassis supports the cab as well as wheels and/or tracks that enable the work vehicle to move. On some work vehicles, the wheels and/or tracks may be large and, therefore, lift the cab a significant distance from the ground. In order to access the cab, an operator may scale a ladder from the ground to a platform next to the cab.

BRIEF DESCRIPTION

The present disclosure relates to a work vehicle control system including a steering control system that controls steering of a work vehicle. A controller including a processor and memory, wherein the controller receives a signal indicative of a probability of an operator being outside of a cab of the work vehicle, and wherein the controller disables the steering control system in response to the signal.

The present disclosure also relates to a work vehicle control system including at least one load cell sensor that generates a load signal indicative of a weight, wherein the load cell sensor generates the load signal in response to detection of a load on a work vehicle. A controller including a processor and memory, wherein the controller receives the load signal and compares the load signal to a threshold level and in response outputs a disabling signal if the load signal is greater than the threshold level. A steering control system that receives the disabling signal from the controller and disables steering of the work vehicle in response to receiving the disabling signal.

The present disclosure also relates to at least one tangible non-transitory computer readable medium including instructions for a work vehicle controller, wherein the instructions use the work vehicle controller to receive a first signal indicative of a probability of an operator being outside of a cab of a work vehicle and output a disabling signal to a steering control system to disable movement of the rear assembly of the work vehicle.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Figure 1:
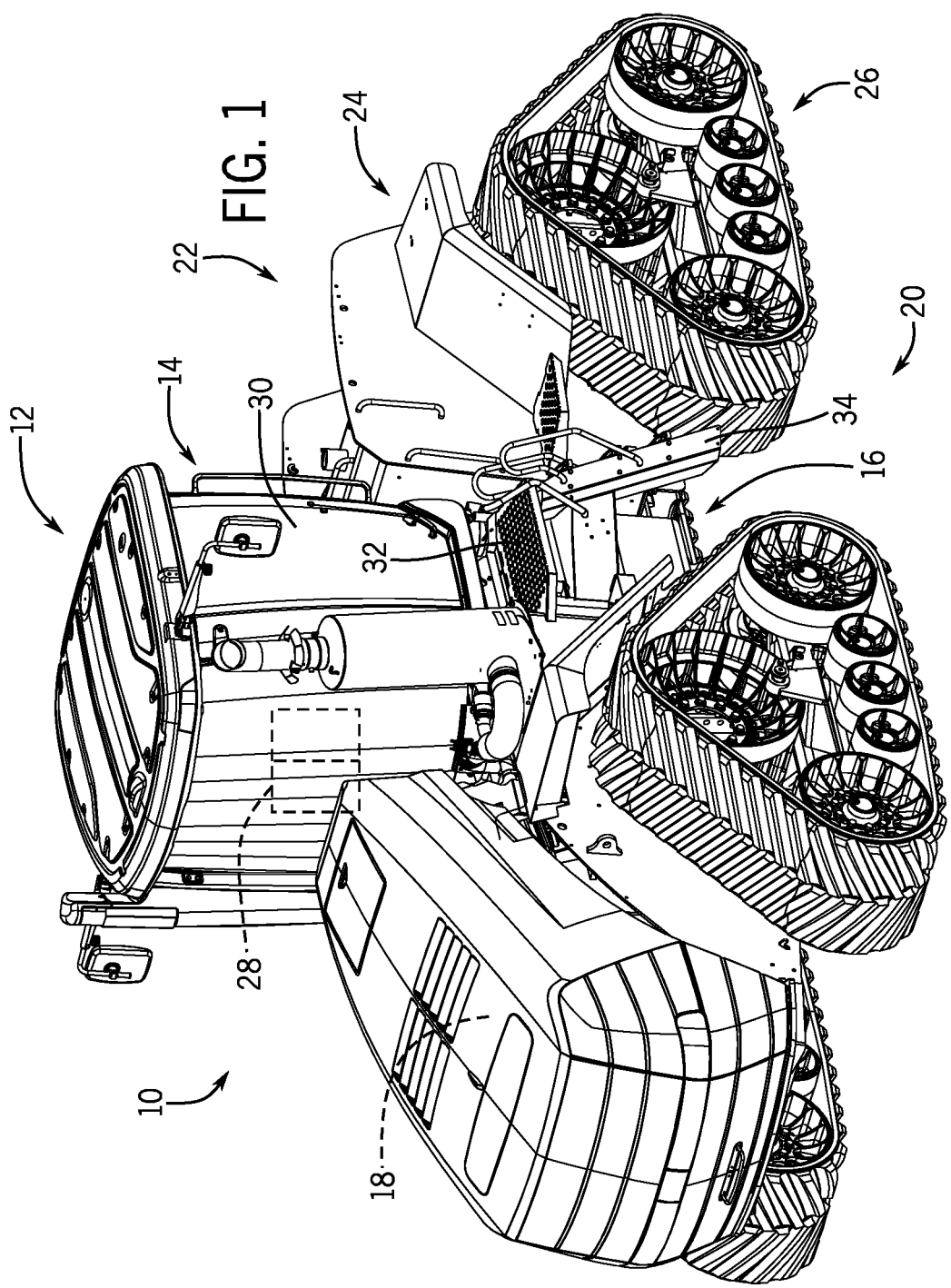
FIG. 1 is a perspective view of an embodiment of a work vehicle that includes a work vehicle control system.

FIG. 1 is a perspective view of an embodiment of a work vehicle 10 that includes a work vehicle control system 12. In the illustrated embodiment, the work vehicle 10 is a tractor. However, in some embodiments, the work vehicle 10 may be an on-road truck, tractor, harvester, etc. As illustrated, the work vehicle 10 includes a cab 14 mounted on a chassis 16. The chassis 16 may support a motor 18 (e.g., diesel engine, etc.), tracks 20, a hydraulic system (e.g., including a pump, valves, a reservoir, etc.), as well as other systems (e.g., an electrical system, a cooling system, etc.) that facilitate operation of the work vehicle 10. In order to steer the work vehicle 10, the work vehicle 10 uses the rear tracks 20. As will be shown in FIGS. 2, 3, and 4, the rear tracks 20 rotate about the work vehicle 10 enabling the work vehicle 10 to turn. It should be understood that while the work vehicle 10 in FIG. 1 includes tracks 20, in some embodiments, the work vehicle may include wheels or a combination of tracks 20 and wheels that enable steering of the work vehicle 10.

The cab 14 is configured to house an operator of the work vehicle 10 during operation. The cab 14 may be climate controlled as well as provide access to various controls of the work vehicle 10. For example, the cab 14 may include controls such as a hand controller, steering wheel, etc. that provide input to a steering control system 22 for steering the work vehicle 10. In operation, the steering control system 22 (e.g., valves, hydraulics, etc.) enables the operator to rotate a rear assembly 24, which includes the rear tracks 26 of the work vehicle 10 through a range of steering angles in order to steer the work vehicle 10. In some embodiments, the cab 14 may also include a user interface 28 for receiving feedback and providing input to control various operations and systems of the work vehicle 10.

The cab 14 includes a door 30 that enables an operator to enter and exit the cab 14. The work vehicle 10 also includes a platform 32 next to the door 30 to facilitate access. The platform 32 couples to the chassis 16 and/or cab 14. The platform 32 is accessed using a ladder 34 that couples to the platform 32 and/or chassis 16. The ladder 34 enables an operator to climb up and down from the platform 32 when entering and/or exiting the cab 14. In order to prevent the tracks 20 from contacting the ladder 34, the ladder 34 automatically rotates about the platform 32 as the tracks 20 change position.

Figure 2:
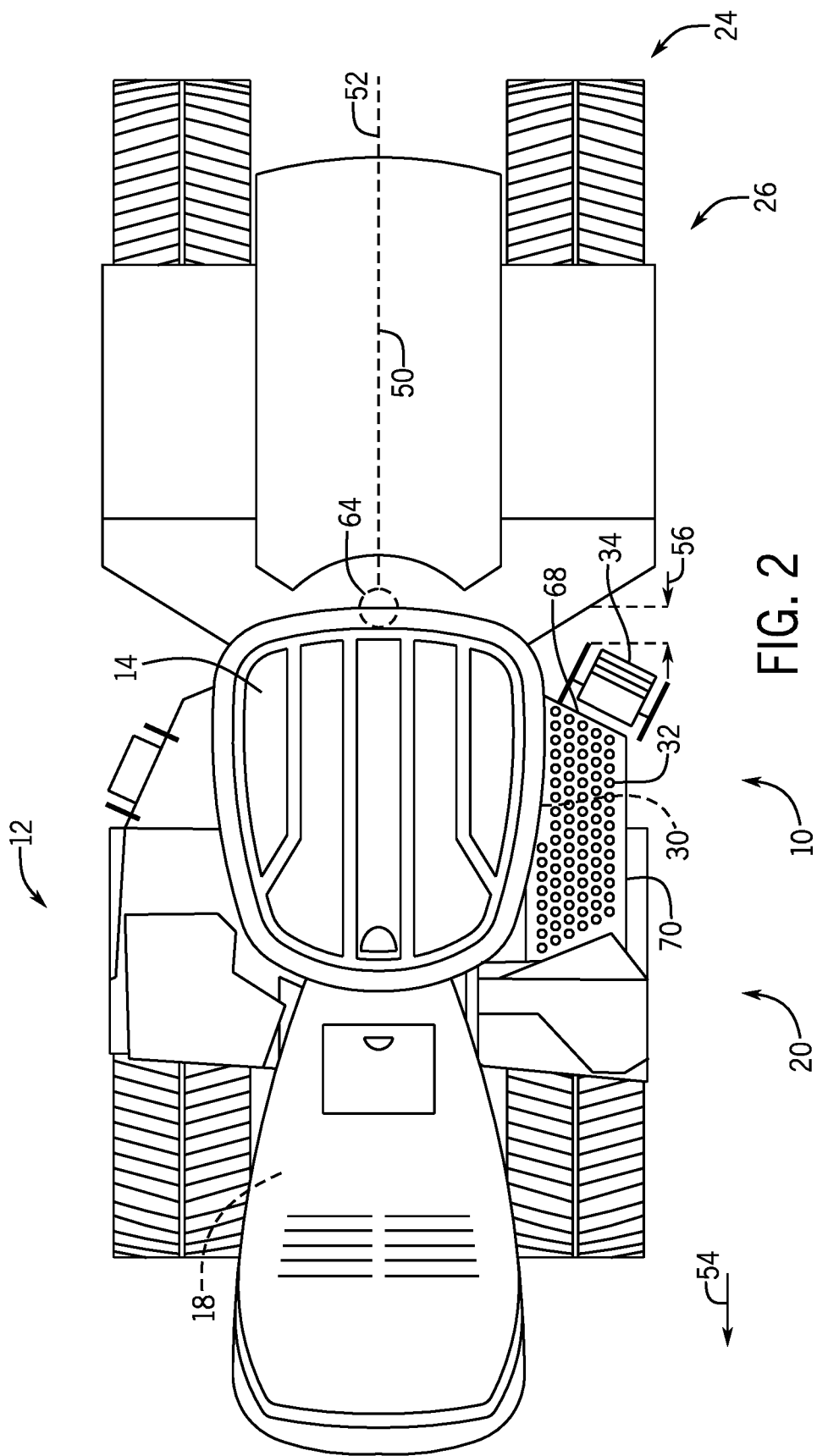
FIG. 2 is a top view of an embodiment of the work vehicle in FIG. 1, with the work vehicle at a neutral steering angle.

FIG. 2 is a top view of an embodiment of the work vehicle 10 of FIG. 1, with the work vehicle 10 at a neutral steering angle 50. That is, the rear assembly 24 is aligned with the longitudinal axis 52 of the work vehicle 10. At the neutral steering angle 50, the rear assembly 24 of the work vehicle 10 is positioned so that the work vehicle 10 drives straight in a direction of travel 54. In some embodiments, the ladder 34 is automatically positioned proximate the rear assembly 24 of the platform 32, between the platform 32 and a rear left track 26 of the work vehicle 10, when the work vehicle 10 travels straight in the direction of travel 54. However, the ladder 34 is configured to automatically move with respect to the platform 32 in response to movement (i.e., rotation) of the rear assembly 24, which may be controlled by the steering control system 22 of the work vehicle 10. When the work vehicle 10 is at a neutral steering angle 50, a gap 56 exists between the rear left track, and the platform 32 in the direction of travel 54 so that the ladder 34 may be positioned between of the platform 32 and the rear left track of the work vehicle 10 without contacting the rear left track.

Figure 3:
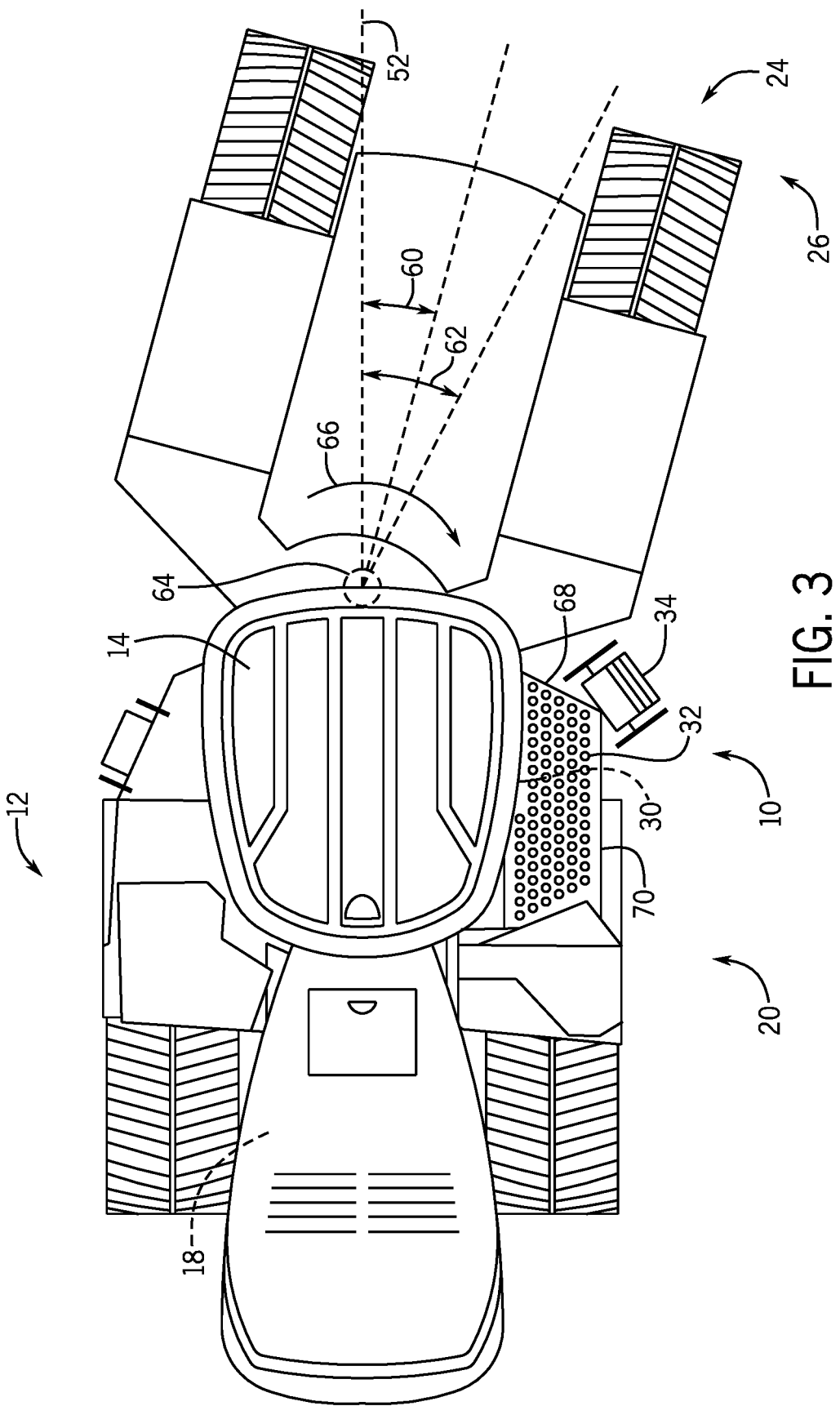
FIG. 3 is a top view of the work vehicle in FIG. 2, with the work vehicle at a half left steering angle.

FIG. 3 is a top view of the work vehicle 10 of FIG. 2, with the work vehicle 10 at a half left steering angle 60 with respect to the longitudinal axis 52 of the work vehicle 10 (i.e., a steering angle halfway between a full left steering angle 62 and a neutral steering angle 50). At a half left steering angle 60, the work vehicle 10 may turn slightly to the left while moving. To reach a half left steering angle 60, the rear assembly 24 of the work vehicle 10 rotates about the pivot point 64 in direction 66 such that a left side of the rear assembly 24 moves closer to a rear portion 68 of the platform 32. As the rear assembly 24 of the work vehicle 10 rotates, the rear left track moves closer to the platform 32 and the distance between the rear left track and the platform 32 decreases. To prevent the ladder 34 from contacting/obstructing the tracks, the ladder 34 automatically moves toward a side portion 70 of the platform 32.

Figure 4:
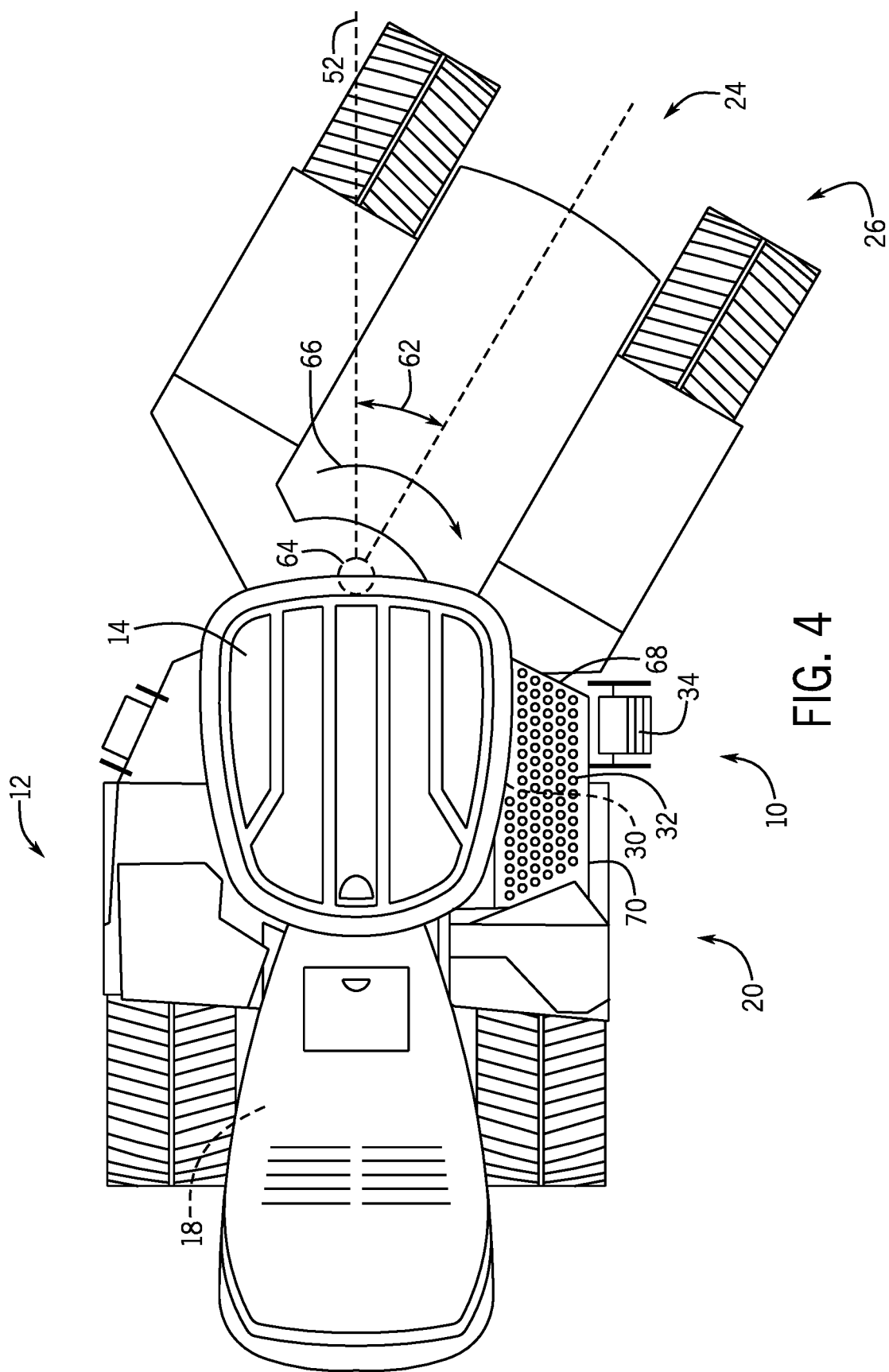
FIG. 4 is a top view of the work vehicle in FIG. 2, with the work vehicle at a full left steering angle.

FIG. 4 is a top view of the work vehicle 10 of FIG. 2, with the work vehicle 10 at a full left steering angle 62. At a full left steering angle 62, the work vehicle 10 turns to the left. To reach the full left steering angle 62 from the half-left steering angle 60, the rear assembly 24 of the work vehicle 10 continues to rotate in the direction 66 about the pivot point 64. Consequently, the rear left track moves even closer to the platform 32. To prevent contact, the ladder 34 again rotates about the platform 32 so that the ladder 34 is positioned adjacent the side portion 70 of the platform 32.

Similarly, when the work vehicle 10 transitions from the full left steering angle 62 to the half left steering angle 60 or the neutral steering angle 50, the ladder 34 rotates/moves towards the rear portion 68 of the platform 32. In this way, the ladder 34 moves back and forth between a position adjacent a side portion 70 of the platform 32 and a position adjacent the rear portion 68 of the platform 32. Movement of the ladder 34 is automatic in response steering of the work vehicle 10 by the operator. As will be explained in greater detail below, the work vehicle control system 12 disables the steering of the work vehicle 10 under certain conditions to prevent unintended movement of the ladder 34.

Figure 5:
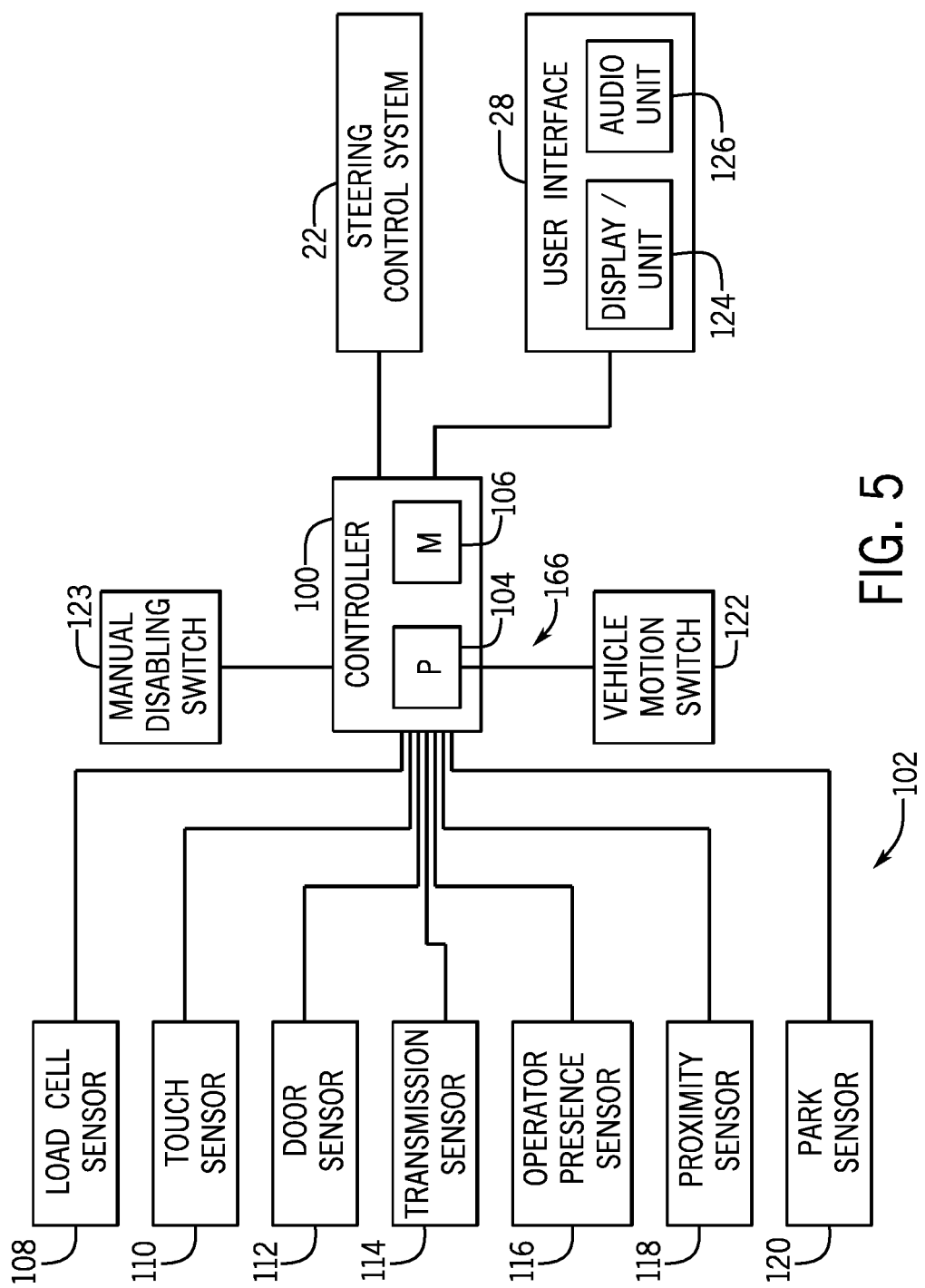
FIG. 5 is a schematic diagram of an embodiment of a work vehicle control system.

FIG. 5 is a schematic diagram of an embodiment of a work vehicle control system 12 of the work vehicle 10 of FIG. 1. The work vehicle control system 12 includes a controller 100 configured to receive one or more signals from one or more sensors 102 that indicate a probability of an operator being outside of a cab 14 of the work vehicle 10. In response to the signals, the vehicle control system 12 may block movement of the rear assembly 24 (e.g., lock the steering) to block movement of the ladder 34. For example, the controller 100 may send a disabling signal to disable the steering control system 22.

In order to output instructions, the controller 100 includes a processor. In the illustrated embodiment, the controller 100 includes one or more processors 104 coupled to one or more memories 106. The one or more memories 106 include instructions executed by the processor 104 to control operation of the work vehicle 10. The controller 100 may include multiple microprocessors, one or more "general-purpose" microprocessors, one or more special-purpose microprocessors, and/or one or more application specific integrated circuits (ASICS), or some combination thereof. For example, the processor 104 may include one or more reduced instruction set (RISC) processors.

The memory 106 may include a volatile memory, such as random memory (RAM), and/or a nonvolatile memory, such as read-only memory (ROM). The memory 106 may store a variety of information and may be used for various purposes. For example, the memory 106 may store processor executable instructions (e.g., firmware or software) for the processor 104 to execute, such as instructions for controlling the steering control system 22, and so forth. The controller may include storage device(s) (e.g., nonvolatile memory) having ROM, flash memory, a hard drive, or any other suitable optical, magnetic, or solid-state storage medium, or a combination thereof. The storage device(s) may store data, instructions (e.g., software or firmware for controlling the steering control system 22), and any other suitable data.

One of the sensors 102 may be a load cell sensor 108 configured to output a signal indicative of a load on the ladder 34 and/or the platform 32. The load cell sensor 108 is configured to measure strain caused by a load (e.g., weight) applied to the ladder 34 and/or platform 32. For example, the work vehicle 10 may include multiple load cell sensors 108 on the platform 32 and/or the ladder 34 that detect when an operator or another person is on the ladder 34 and/or platform 32. The load cell sensor 108 is configured to output a load signal to the controller 100 indicative of a probability of an operator being outside of a cab of the work vehicle (e.g., a person is on the ladder 34). The controller 100 receives the signal and determines if the load signal (indicative of a weight) is greater than a threshold level (e.g., 50 lbs.). If the load is greater than the threshold level, then the controller 100 outputs a signal to the steering control system 22 to disable the steering control system 22 to block movement of the ladder 34.

In some embodiments, load cell sensor 108 may output the signal when strain exceeds a threshold level. Thus, the load cell sensor 108 may be adjusted to allow a minimum load to be applied to the ladder 34 and/or platform 32 before outputting the signal. Setting a minimum load may reduce or block instances of the load cell sensor 108 outputting the signal when an operator and/or occupant is not in contact with the ladder 34 and/or the platform 32.

In some embodiments, the work vehicle 10 may include multiple load cell sensors 108. For example, the ladder 34 may be coupled to the chassis 16 of the work vehicle 10. In this situation, loads applied to the ladder 34 may not transfer to the platform 32. Thus, a load applied to the ladder 34 may not be detected by a load cell sensor 108 disposed on the platform 32 and vice versa. Some embodiments may therefore include one or more load cell sensors 108 on one or more steps of the ladder and/or on the platform 32 to enhance detection through redundancy or to provide more accurate readings.

In some embodiments, the load sensor 108 may also be placed in an operator's seat. In this arrangement, the load sensor 108 detects when a load is removed (i.e., when the operator gets out of his seat). The absence of the load in the seat may indicate the operator is on the platform 32 or the ladder 34. When no load is detected, the load sensor 108 outputs a signal to the controller 100 indicative of a probability of an operator being outside of a cab 14 of the work vehicle 10 (e.g., a person is on the ladder 34). The controller 100 then outputs a signal to the steering control system 22 to disable the steering control system 22 to block automatic movement of the ladder 34.

In some embodiments, the work vehicle control system 12 may include a touch sensor 110 that detects when the operator and/or another person is in contact with an exterior portion of the work vehicle 10. For example, the touch sensor 110 may be a capacitive sensor that detects changes in voltage in response to an operator and/or another person touching the ladder 34 and/or platform 32. When the controller 100 receives a signal from the touch sensor 110, the controller 100 may disable the steering control system 22 to block movement of the ladder 34.

The work vehicle control system 12 may also include a door sensor 112 configured to output a signal when the door 30 of the work vehicle 10 is open and/or unlocked. An open door 30 on a work vehicle 10 may indicate that an operator and/or occupant are on the platform 32 and/or ladder 34. To prevent unintended movement of the ladder 34 while the operator and/or occupant are on the platform 32 and/or ladder 34, the door sensor 112 is configured to output a signal when the door 30 of the work vehicle 10 is ajar. The controller 100 receives the signal indicative of a probability of an operator being outside of a cab 14 of the work vehicle 10 (e.g., a person is on the ladder 34) and in response blocks movement of the rear assembly 24 which blocks automatic movement of the ladder 34.

In some embodiments, the work vehicle control system 12 includes a transmission sensor 114 that outputs a signal when the work vehicle 10 is parked. A parked work vehicle 10 may be indicative of an operator on the platform 32 and/or ladder 34. Accordingly, when the operator places the transmission into park (e.g., manual transmission, automatic transmission), the transmission sensor 114 sends a signal to the controller 100 indicative of a probability of an operator being outside of a cab 14 of the work vehicle 10 (e.g., a person is on the ladder 34). The controller 100 in response controls the steering control system 22 to block movement of the rear assembly 24 and thus movement of the ladder 34. In some embodiments, the transmission sensor 114 may detect when the transmission is in neutral, and in response sends a signal to the controller 100. A work vehicle 10 in neutral may also indicate that an operator or another person is near or on the platform 32 and/or ladder 34. The controller 100 in the situation may again control the steering control system 22 to block automatic movement of the rear assembly 24.

In some embodiments, the work vehicle control system 12 includes an operator presence sensor 116. The cab 14 of the work vehicle 10 includes a seat that supports an operator while operating the work vehicle 10. In operation, the presence sensor 116 outputs a signal to the controller 100 when the operator is not seated on the seat. In response, the controller 100 may then block operation of the steering control system 22 to block movement of the rear assembly 24 and thus movement of the ladder 34. The operator presence sensor 116 may be a load cell sensor 108, radar, infrared camera, video camera, etc. as well as combinations thereof.

In some embodiments, the work vehicle control system 12 includes a proximity sensor 118 that detects when an operator and/or another person is near the ladder 34 and/or platform 32. For example, during operation the operator and/or another person may approach the work vehicle 10 with the intent of scaling the ladder 34 to access the cab 14. The proximity sensor 118 detects the approach and/or presence of the operator and/or another person and outputs the signal to the controller 100 indicative of a probability of an operator being outside of a cab 14 of the work vehicle 10. The controller 100 may then disable the steering control system 22 to block movement of the rear assembly 24. The proximity sensor 118 may be a radar sensor, infrared camera, video camera, etc. as well as combinations thereof.

In some embodiments, the work vehicle system 12 includes a parking sensor 122 that detects when a parking brake on the work vehicle 10 is engaged. In operation, the parking brake sensor 122 outputs a signal to the controller 100 when the operator activates the parking brake. A parked work vehicle 10 may indicate that the operator and/or another person may be near and/or on the ladder 34. In response, the controller 100 may disable the steering control system 22 to block movement of the rear assembly 24 and the ladder 34.

As illustrated, the controller 100 receives feedback from the sensors 102, thereby enabling the controller 100 to determine whether to disable the steering control system 22 to block movement of the ladder 34. In some embodiments, the work vehicle control system 12 may include all of the sensors 102 described above or a subset thereof. For example, the work vehicle control system 12 may only include a single sensor. In embodiments containing more than one type of sensor 102, the controller 100 may cross-reference feedback from the various sensors 102 to determine whether to disable the steering control system 22 and thus block movement of the rear assembly 24 and the ladder 34. In other words, the controller 100 may only disable the steering control system 22 if multiple sensors 102 indicate a probability of an operator being outside of a cab 14 of the work vehicle 10 (e.g., from a load cell sensor 108 and a door sensor 112). In some embodiments, the controller 100 may receive feedback from a predetermined combination sensors 102 (e.g., the transmission sensor 114 and the door sensor 112) in order to disable the steering control system 22.

In some embodiments, after the controller 100 determines that a probability of an operator being outside of a cab 14 of the work vehicle 10 is below a threshold level, the controller 100 may wait a period of time (e.g., delay period) before again activating the steering control system 22. This delay period (e.g., 10 seconds, 20 seconds, 30 seconds, etc.) may enable an operator and/or other person time to move away from the ladder 34 before the work vehicle 10 regains the ability to steer (i.e., move the rear assembly 24). In some embodiments, the operator may adjust the duration of the delay period.

In some embodiments, the work vehicle control system 12 includes a vehicle motion sensor 122 that outputs an override signal when the work vehicle 10 is moving. The override signal prevents the controller 100 from disabling the steering control system 22, thereby enabling an operator to continue operation of the work vehicle 10 despite (feedback from the sensors 102.) In some embodiments, the operator may also manually override the controller 100 using a manual disabling switch 123. This enables the operator to continue operating the work vehicle 10 regardless of (feedback from the sensors 102.)

In some embodiments, the controller 100 may provide feedback from one or more sensors 102 to the operator. For example, the user interface 28 may include a display 124 and/or an audio unit 126 (e.g., audio speaker) that enables the controller 100 to inform an operator about a probability of an person being outside of a cab 14 of the work vehicle 10 (e.g., while driving the work vehicle 10). In some embodiments, the controller 100 may instruct to the user interface to generate a tone, beep, spoken message. In some embodiments, the controller 100 may output a signal that activates a visual image on the display 124. The visual image may be a flashing light, solid colored light, illustrations, symbols, written message, and/or actual images from a camera that are shown on the display 124. In some embodiments, the controller 100 may provide both an audio signal as well as a visual signal to inform the operator regarding a probability of someone being outside of a cab 14 of the work vehicle 10 and why the steering control system 22 is disabled.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A work vehicle control system, comprising:
   a steering control system configured to control steering of a work vehicle; and
   a first sensor configured to output a signal indicative of a probability of an operator or another person being on a platform or a ladder of the work vehicle that are positioned outside of a cab of the work vehicle; and
   a controller comprising a processor and memory, wherein the controller is configured to receive the signal indicative of the probability of the operator or another person being outside of the cab of the work vehicle, and wherein the controller is configured to disable the steering control system in response to the signal.

2. The work vehicle control system of claim 1, wherein the first sensor is a load cell sensor.

3. The work vehicle control system of claim 1, comprising a door sensor configured to output the signal indicative of the probability of the operator being outside of the cab in response to detection of a door of the work vehicle in an open position.

4. The work vehicle control system of claim 1, comprising an operator presence sensor configured to output the signal indicative of the probability of the operator being outside of the cab in response to detection of an operator not seated on a seat disposed within the cab of the work vehicle.

5. The work vehicle control system of claim 1, comprising a transmission sensor configured to output the signal indicative of the probability of the operator being outside of the cab in response to detection of a transmission of the work vehicle in park.

6. The work vehicle control system of claim 1, comprising a vehicle motion sensor configured to generate an override signal while the work vehicle is moving.

7. The work vehicle control system of claim 1, wherein the first sensor is a proximity sensor.

8. The work vehicle control system of claim 1, wherein the controller is configured to disable the steering control system only if the controller receives the signal indicative of the probability of the operator being outside of the cab from at least two sensors.

9. The work vehicle control system of claim 1, comprising a user interface configured to display a visual image indicating the probability of the operator being outside of the cab.

10. The work vehicle control system of claim 9, wherein the visual image is at least one of a symbol, a light, an actual image of the probability of the operator being outside of the cab, and a written message.

11. The work vehicle control system of claim 10, wherein the user interface comprises a manual disabling switch configured to block the controller from disabling the steering control system.

12. The work vehicle control system of claim 9, wherein the user interface comprises an audio unit configured output an audio message.

13. The work vehicle control system of claim 12, wherein the audio message is at least one of a beep, a warning tone, and a spoken message.

14. The work vehicle control system of claim 1, wherein the work vehicle is a tractor, the tractor comprises the ladder and the platform, and the ladder is configured to move with respect to the platform in response to a steering movement initiated by the steering control system.

15. A work vehicle control system, comprising:
   at least one load cell sensor configured to generate a load signal indicative of a weight, wherein the load cell sensor generates the load signal in response to detection of a load on a platform or a ladder of a work vehicle that are positioned outside of a cab of the work vehicle;
   a controller comprising a processor and memory, wherein the controller is configured to receive the load signal compare the load signal to a threshold level and in response output a disabling signal if the load signal is greater than the threshold level; and
   a steering control system configured to receive the disabling signal from the controller and to disable steering of the work vehicle in response to receiving the disabling signal.

16. The work vehicle control system of claim 15, wherein the work vehicle is a tractor comprising the ladder configured to move with respect to the platform of the tractor in response to a steering movement initiated by the steering control system.

17. The work vehicle control system of claim 15, wherein the controller waits for a delay period after disabling the steering control system, before enabling the steering control system to again control steering of the work vehicle.

18. At least one tangible non-transitory computer readable medium comprising instructions for a work vehicle controller, wherein the instructions are configured to use the work vehicle controller to:
   receive a first signal indicative of a probability of an operator or another person being on a platform or a ladder of a work vehicle that are positioned outside of a cab of the work vehicle; and
   output a disabling signal to a steering control system to disable movement of the rear assembly of the work vehicle.

19. The tangible non-transitory computer readable medium of claim 18, wherein the instructions are configured to cause the work vehicle controller to output the disabling signal to a user interface such that the user interface alerts a user that steering is disabled.

* * * * *